H. E. COFFIN & G. G. BEHN.
ROTARY VALVE FOR EXPLOSION ENGINES.
APPLICATION FILED JUNE 27, 1910.

1,034,877.

Patented Aug. 6, 1912.

Witnesses

Inventors
Howard E. Coffin &
Guido G. Behn
By Whittemore Hulbert & Whittemore
Attys

UNITED STATES PATENT OFFICE.

HOWARD E. COFFIN AND GUIDO G. BEHN, OF DETROIT, MICHIGAN, ASSIGNORS, BY MESNE ASSIGNMENTS, TO THE REYNOLDS MOTOR COMPANY, OF DETROIT, MICHIGAN, A CORPORATION OF MICHIGAN.

ROTARY VALVE FOR EXPLOSION-ENGINES.

1,034,877.                Specification of Letters Patent.        Patented Aug. 6, 1912.

Application filed June 27, 1910. Serial No. 569,064.

*To all whom it may concern:*

Be it known that we, HOWARD E. COFFIN and GUIDO G. BEHN, citizens of the United States of America, residing at Detroit, in the county of Wayne and State of Michigan, have invented certain new and useful Improvements in Rotary Valves for Explosion-Engines, of which the following is a specification, reference being had therein to the accompanying drawings.

The invention relates to rotary valves of the disk type, and it is the object of the invention to avoid leakage, particularly that occurring between the port and the periphery of the disk. Where valves of this character are used in connection with explosion engines, the seal of the valve upon its seat is effected by a liquid packing introduced therebetween; usually a lubricating oil. This will prevent leakage of the compression gases across the face of the seat in its wider portions, but it has been found that more or less leakage does occur across the comparatively narrow strip separating the port from the periphery of the disk. This difficulty we have avoided in the present construction by the employment of an annular packing outside of the port in the valve disk and preferably engaging a groove in the periphery of the disk.

Figure 1:
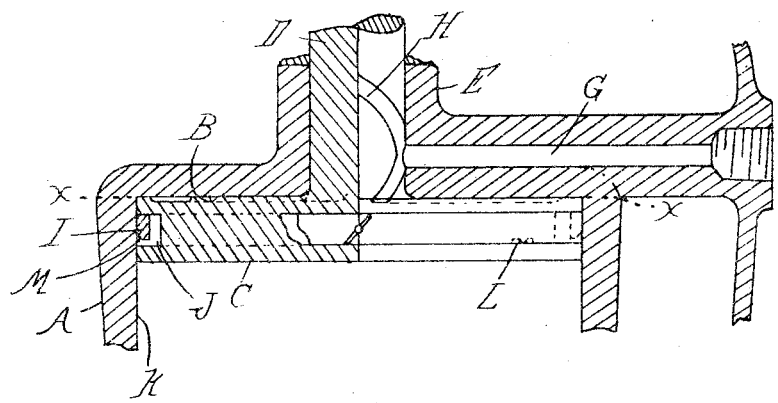
Figure 2:
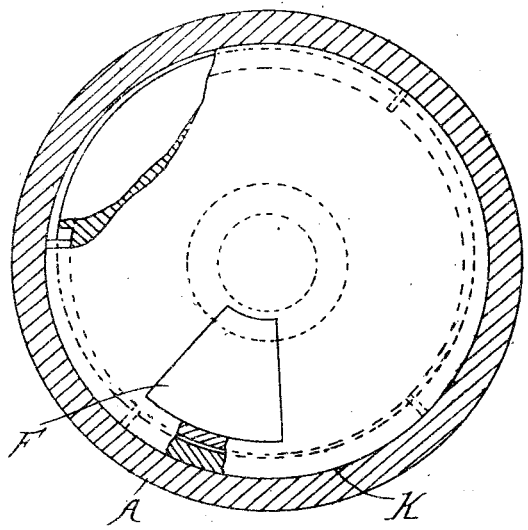

In the drawings,—Figure 1 is a central section through the engine cylinder, to which our valve is applied showing the valve partly in section. Fig. 2 is a plan view looking upward, showing the valve partly in section.

A is a cylinder of an explosion engine which has a valve seat B formed on the inner face of the cylinder head, C is a rotary disk valve mounted upon a rotary stem D which passes out through a journal bearing E in the head, F is a port through the valve disk which may be of any desired shape or area and is adapted to register with a co-operating port in the head (not shown).

To seal the valve a fluid packing is introduced between the seat and face. This is preferably fed between the surfaces near the center so that a centrifugal force caused by the rotation of the valve will assist in forcing the lubricant outward toward the periphery. As shown, G is a channel extending radially in the head to the bearing E for the stem and H is a reversely inclined spiral groove in the stem of the valve which receives the lubricant and propels it in opposite directions. This portion will be used for lubricating the stem in the journal bearing while another portion will be forced inward between the disk and the valve seat to form the seal.

With the construction as thus far described in use, the pressure produced by the explosion within the cylinder will tend to force the film of lubricant backward from the periphery toward the center. The frictional resistance of the entire film extending between the periphery and valve stem is too great to be thus overcome, but the film between the periphery and the port may be blown out which will cause a leakage of the gases and interfere with the successful operation of the engine. We therefore provide in the construction illustrated, a packing ring I which engages a groove J in the periphery of the disk, the outer face of said ring bearing against the wall K of the cylinder. The ring I is constructed to spring outward and a clearance is preferably provided to permit the gas pressure from the cylinder to reach the under face of the ring thereby holding the latter in firm contact with the cylinder. Thus as shown, channels L are formed in the ring communicating with the groove, and the lower edge of the ring is also preferably chamfered at M as shown.

In operation the ring I in connection with the lubricant will form a seal that cannot be broken by the gaseous pressure within the cylinder. If desired, the ring may be caused to rotate with the disk by suitable couplings, but preferably such connection is not employed and consequently the friction between the periphery of the ring and the cylinder will hold the former stationary. However, the disk is free to revolve and the seal is just as effective as would be the case if the ring were revolving with the disk.

What we claim as our invention is:

1. The combination with a rotary disk valve having a port in the face thereof, of a seat for said valve, and a non-rotating packing ring engaging said valve outside of the port.

2. The combination with a rotary disk valve having a port in the face thereof, of a seat for said valve, and a non-rotating ring engaging the periphery of the valve.

3. In combination with a rotary disk valve having a port in the face thereof, a seat for said valve, and a non-rotating packing ring engaging a groove in the periphery of said valve.

4. In combination with an engine cylinder, and the head thereof, of a rotary valve seated against the head of said cylinder, and a non-rotating packing ring engaging the periphery of said valve.

5. The combination with an engine cylinder and the head thereof, of a rotary disk valve seated against the head of said cylinder, and a non-rotating packing ring engaging a peripheral groove in said valve and bearing against the wall of the cylinder.

In testimony whereof we affix our signatures in presence of two witnesses.

HOWARD E. COFFIN.
GUIDO G. BEHN.

Witnesses:
LENA M. CARLE,
ETHEL J. ESSIG.